June 25, 1963 J. GREEN ETAL 3,095,326
BATCH-TYPE APPARATUS FOR TUMBLE COATING DISCRETE PARTICLES
Filed Feb. 19, 1960 5 Sheets-Sheet 1

INVENTORS
JULIUS GREEN
RICHARD W. MORSE
DICK R. WESTFALL
BY

ATTORNEYS

June 25, 1963  J. GREEN ETAL  3,095,326
BATCH-TYPE APPARATUS FOR TUMBLE COATING DISCRETE PARTICLES
Filed Feb. 19, 1960
5 Sheets-Sheet 2

INVENTORS
JULIUS GREEN
RICHARD W. MORSE
BY DICK R. WESTFALL

ATTORNEYS

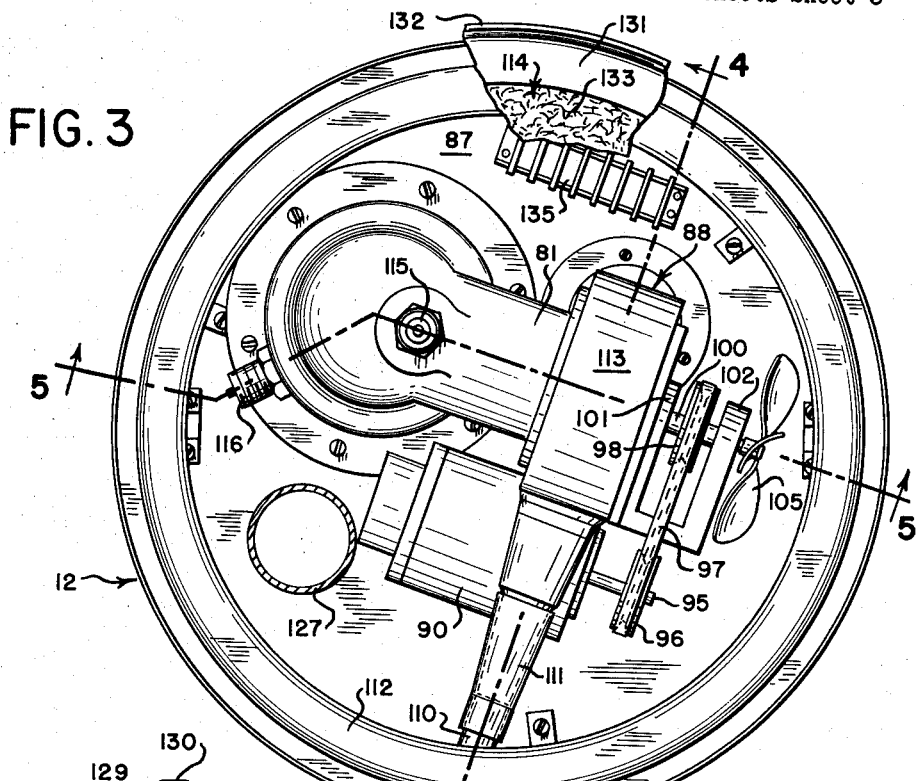
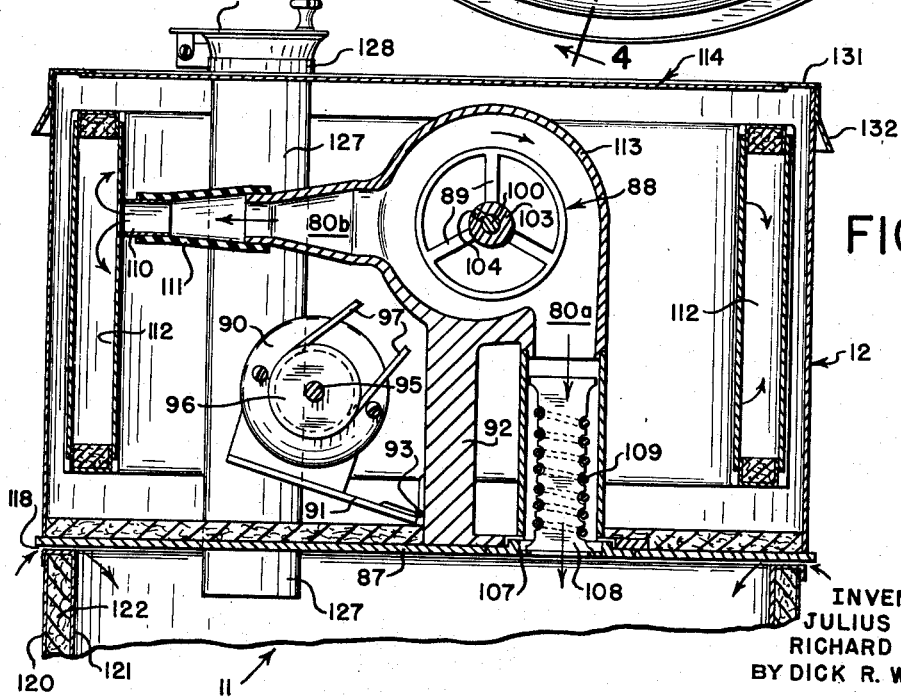

INVENTORS
JULIUS GREEN
RICHARD W. MORSE
DICK R. WESTFALL
BY

ATTORNEYS

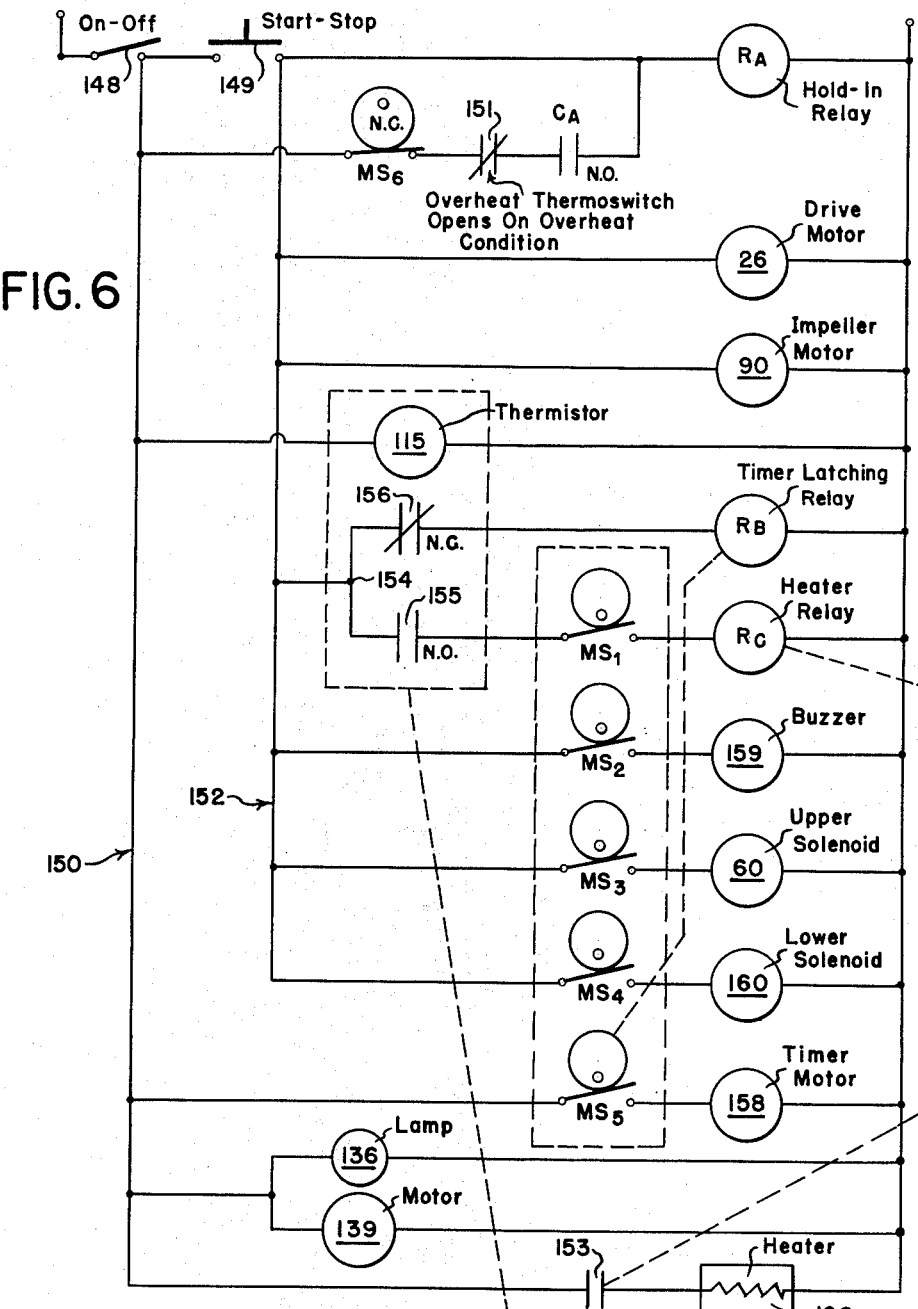

United States Patent Office 3,095,326
Patented June 25, 1963

3,095,326
BATCH-TYPE APPARATUS FOR TUMBLE COATING DISCRETE PARTICLES
Julius Green, New City, Richard W. Morse, Garden City, and Dick R. Westfall, Massapequa Park, N.Y., assignors to General Foods Corporation, White Plains, N.Y., a corporation of Delaware
Filed Feb. 19, 1960, Ser. No. 9,889
14 Claims. (Cl. 118—11)

This invention relates to an apparatus for coating and otherwise treating discrete particles of matter. More particularly, the invention is concerned with an apparatus which has as an important function the application of a candy or sugar coating to irregularly shaped pieces of comestibles, such as cereals like popcorn, puffed wheat and puffed rice, and nuts like cashew, peanuts, and almonds, and to any similar product where an even coating is desired. Another specific function of the apparatus is to pop raw corn.

It is a principal object of the present invention to provide an apparatus for coating discrete particles, which apparatus, in an automatic operation, produces an even coating on particles of regular and irregular form.

It is another object to provide such an apparatus the operation of which involves a high degree of automation and so reduces the technical requirements of an operator that a mechanically unskilled attendant can operate the apparatus efficiently with little prior training.

It is another object to provide an apparatus for coating discrete particles which requires little manual effort in its operation so that an attendant who is possessed of slight physical prowess can efficiently operate the apparatus.

It is a further object to provide an apparatus for coating discrete particles in which the coating is accomplished during rapid movement of the particles so that any tendency of the particles to adhere to one another and to the container will be minimized.

It is a still further object to provide an apparatus for coating discrete particles which is of such dimensions as to be readily installable in a store where the coated product therefrom is to be sold, and which is of such cost as to enable such an installation to be carried out with economic advantages.

It is a more particular object of this invention to provide an apparatus for coating discrete particles which is ideally adapted for batch-type, in-store operation as a machine for popping raw corn and applying a saccharine coating to the popped corn.

The apparatus which is the subject of the present invention comprises a container in the form of a tub or drum having an open end disposable in an upward position in which the container retains a quantity of uncoated morsels, such as popped corn, and a finely comminuted powder to be coated on the corn, and a position in which the open end is disposed downwardly to discharge the contents of the container. Means is provided to rotate the container, as well as a cover which overlies the open end of the container and carries means for forcing heated air into the container during its rotation. The cover is, like the container, capable of assuming at least two different positions, its container-overlying position and another position in which it is disposed away from the container to provide access to the contents of the container.

According to a preferred embodiment of the invention, the weight of the container tends to position it so that the contents thereof will be discharged, and means are provided to continually urge the cover toward a position away from the container. Other than charging the container with a batch of coating composition and particles to be coated, the only physical effort which need be exerted by an attendant operating the apparatus of the present invention is raising the container to retaining position and lowering the cover to a position overlying the mouth of the container. Because the weight of the container and the cover urging means are counterbalanced to a large extent, this effort is slight.

The means for supplying heat to the particles and composition within the rotating container is a distinctive feature of the present invention. According to this feature, a passageway is formed within the cover of the invention. The passageway terminates at its ends in an intake duct and an outlet duct, which are located adjacent to the mouth of the container when the cover is in a position overlying the container. Suitable impeller means draws air into the intake duct, through the passageway, into contact with air heating means, and through the outlet duct into the container. Thus a continuous circulation of air is maintained through the container and the cover and the temperature of the contents of the container may easily be held within a predetermined range. Filter means are advantageously provided to screen air at the intake duct, and an exhaust conduit may be formed as an extension of the passageway to bleed off, filter, and discharge from the cover to the ambient atmosphere a minor portion of the air in the passageway. A narrow aperture between the cover and the container is maintained in this form of the invention so that the discharged air can be replaced by air passing through the aperture into the container.

According to a distinctive feature of the invention, latch means securely hold the container in morsel-retaining position and the cover in position overlying the mouth of the container when the container and the cover have been manually so disposed. Electrically energizable means are provided to selectively engage the latch means and release the container and the cover so that they can resume their normal position. Such energizable release means makes possible the sequential, automatic operation of the apparatus which results in the accomplishment of many of the advantages possessed by the invention. It is this sequential energizing which makes possible: (a) the automatic processing of discrete particles and coating composition once the attendant has placed a batch thereof in the container and brought the container and cover into operative positions, and (b) the discharge of the container contents without further attention to the apparatus by the attendant.

These and other objects, features, and advantages of the present invention will become more apparent when considered in connection with the illustration of a specific embodiment of the invention shown in the accompanying drawings, which form a part hereof, and in which:

FIG. 3 is a top plan view of a cover and container according to the invention, with the lid of the cover partly cut away;

FIG. 4 is a vertical sectional view along the line 4—4 of FIG. 3;

FIG. 6 is a wiring diagram suitable for use with the embodiment of the invention illustrated in FIGS. 1 to 5.

Figure 1:
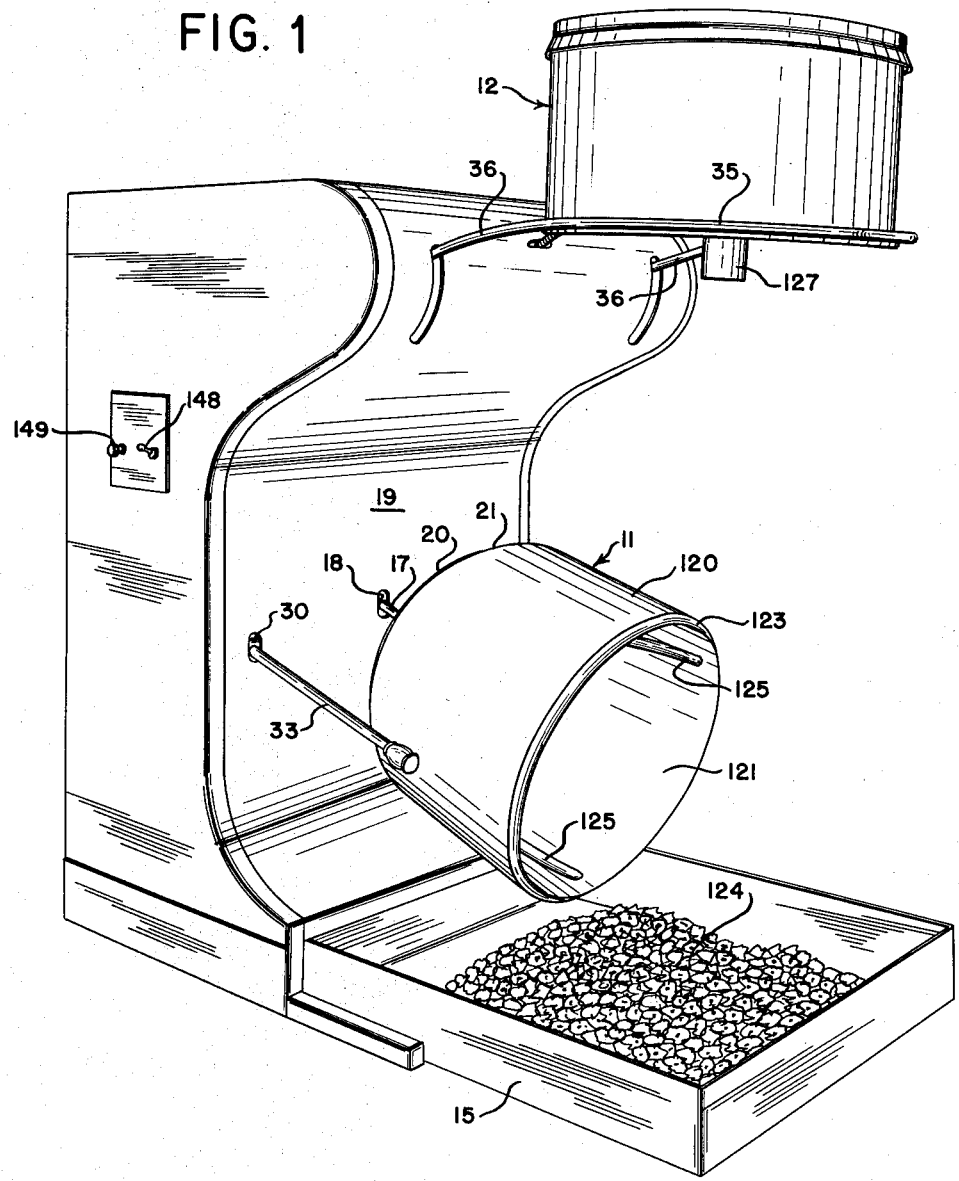
FIG. 1 is a perspective view of an embodiment of the invention with the container in discharge position and the cover in open position.
Figure 2:
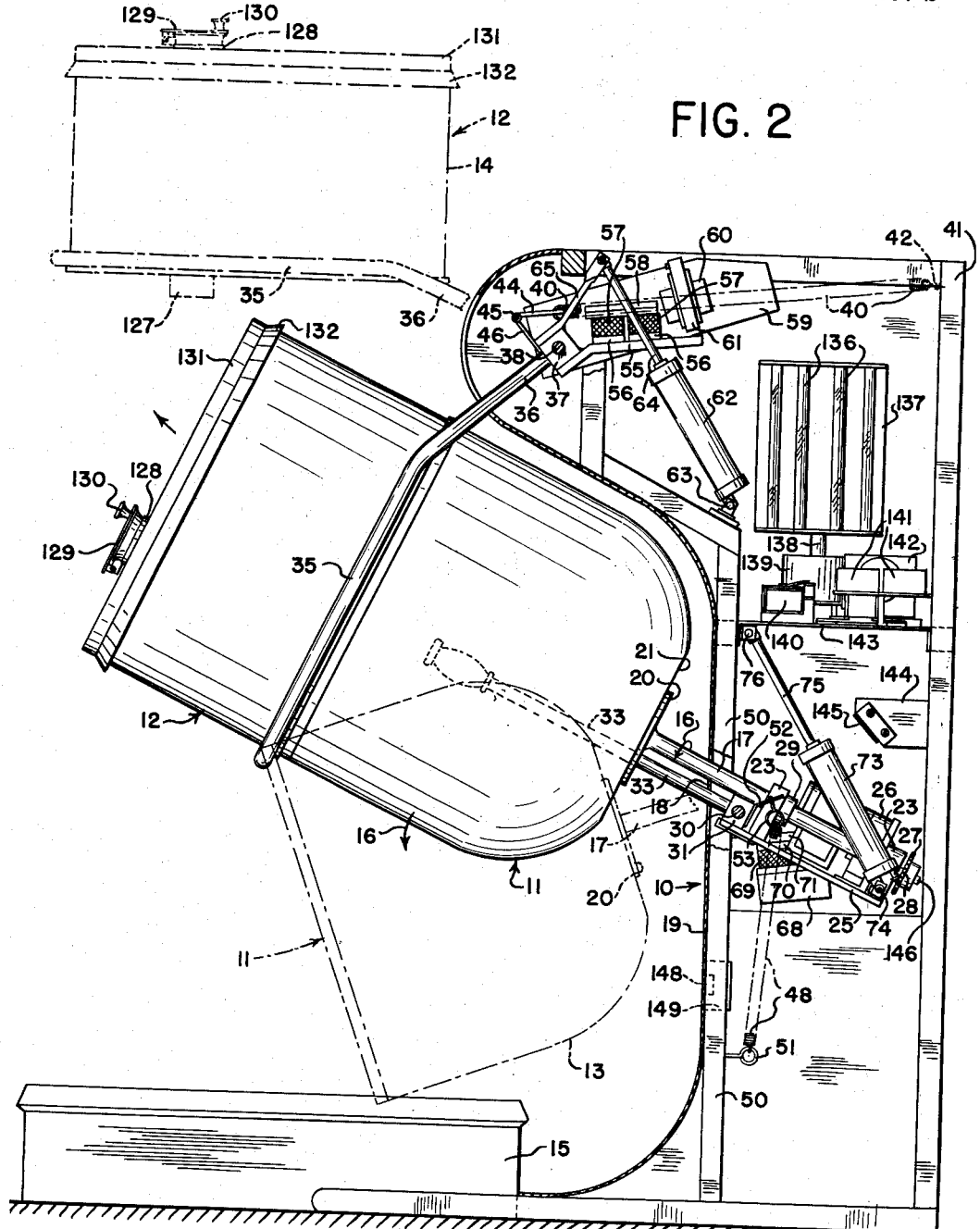
FIG. 2 is a vertical sectional view of the embodiment of FIG. 1 with the container in retaining position and the cover in closed position.

Referring now to the drawings, and to FIG. 1 in particular, the embodiment of the invention illustrated therein comprises a housing 10 and means anchored within the housing for supporting a container 11 in the form of a tub or drum open at one end, and a cover 12. The container 11 is shown in a position in which its open end or mouth is directed downwardly so that the contents thereof are discharged, preferably into a receiving pan 15 (FIG. 2). The cover 12 is illustrated in an upwardly disposed or open position in which it is positioned at a maximum distance from the container 11.

The same embodiment is seen in FIG. 2 in a position in which the container 11 is upwardly disposed so that any contents thereof will be retained within the container, and the cover 12 is disposed in a downward or closed position in which it overlies the open mouth of the container. The positions of the container 11 and cover 12, as seen in FIG. 1, are indicated in FIG. 2 by broken lines 13 and 14, respectively.

As will be apparent from the arrows 16, the container 11 is mounted for rotary movement, which has been indicated as being in a counter clockwise direction. Such mounting is accomplished by means of a rotary shaft 17 which extends through an aperture 18 in the front wall 19 of the housing 10 and terminates at one end in a plate 20 securely fixed by welding or similar means to the bottom wall 21 of the container 11. Shaft 17 is journaled in spaced bearings 23 fixed to container drive base plate 25, so that pivotal movement of the shaft 17 and the container 11 is coincident with like movement of the base plate 25. A motor 26 is likewise secured to the base plate 25 and propels the shaft 17 by means of a chain 27, which engages and turns a sprocket 28 within which the shaft 17 is securely journaled at its end away from the container 11. Collars 29 (one of which is shown) encircle the shaft 17 at suitable locations adjacent to the bearings 23 to limit axial movement of the shaft 17.

The container drive base plate 25 is secured at one end to a torsion bar 31 which extends across the length of the housing 10 and is pivotally secured to side frame parts of the housing by means of trunnions 30. As a consequence, pivotal movement of torsion bar 31 with relation to the housing 10 effects like pivotal movement of the base plate 25 and the shaft 17 carried thereby. This movement may be accomplished by means of a handle 33 which extends through an elongated aperture in the front wall 19 of the housing 10 and is fixed at one end to the torsion bar 30.

The cover 12 is also capable of pivotal movement. A yoke 35 loops about the periphery of the cover 12 and is secured at its free ends 36 to the torsion bar 37, which extends the entire length of the housing 10 and is pivotally mounted in side members of the frame which supports the housing 10 by means of trunnions 38 in the same manner as the torsion bar 31 is mounted. The cover 12 is not capable of rotary movement, as is the container 11, but does pivot between a lower, closed position, as shown in FIG. 2, in which it overlies the open mouth of the container 11 and an upper open position indicated by broken lines 14, in which it is removed from the mouth of the container 11.

The container 11 and the cover 12 are each urged in one direction of their pivotal movement. As seen in FIG. 2, the cover 12 is continually urged into its upward or open position by a tension spring 40. At its farthest end from the cover 12 tension spring 40 is anchored to a back member 41 of the framework of the housing 10 by a spring anchor 42. At its end nearest the cover 12 tension spring 40 is connected to a leaf 44 of hinge 45, which hinge is connected to the torsion bar 37 by means of another leaf 46.

Since the spring 40, in any position of the cover 12, is extended out of its normal shape, the tension in the spring 40 exerts a force in the general direction of the rear member 41 of the housing frame on hinge leaf 44 and consequently urges hinge leaf 46 in a direction in which it causes the torsion bar 37 to pivot in a clockwise direction within the housing 10.

The container 11 is continually urged by the tension spring 48 in a direction in which it will be pivoted toward retaining position. The weight of the container itself, however, is sufficient to act against the force of the tension spring 48, which force merely exerts a counter-balancing effect so that, when the container 11 is in a position to freely pivot about the torsion bar 30, its full weight will be counter-balanced to an extent by the tension spring 48. As seen in FIG. 2, tension spring 48 is anchored on a front frame member 50 of the housing 10 by eye bolt 51 and to bracket 52 fixed to torsion bar 31 by means of eye bolt 53, which is threaded in an aperture in bracket 52 and is adjustable therein to vary the tension in the spring 48. It will be noted that, while a single spring only has been indicated in FIG. 2 by line 40 and line 48, a multiplicity of such springs will normally be used. Substantial variations in the force to be applied to torsion bars 30 and 37 may thus be effected.

Because the weight of the container 11 and the force of the tension spring 40, respectively, tend to impel the container 11 and the cover 12 to positions illustrated in FIG. 1, latch means are provided for maintaining the container 11 and the cover 12 in the positions illustrated in FIG. 2. As seen in that figure, a striker angle bracket 55 is fixed to torsion bar 37 for movement therewith. Mounted on striker angle bracket 55 are two striker plates 56 which, when the cover 12 is in a position in which it overlies the open mouth of the container 11, as illustrated in FIG. 2, abut spaced magnets 57 and are maintained in that position by the magnets 57, which are fixed to a support 58 connected to a mounting plate 59 on the frame of the housing 10. The magnets 57 are thus firmly fixed to the frame of the housing. Also fixed to the mounting plate 59 is a pusher-type solenoid 60, which has a pusher bracket 61 disposed to move downwardly against one end of the striker angle bracket 55 when the solenoid 60 is actuated. The combination of striker plates 56 and magnets 57 constitute one form of latch or holding means, as used in the inventive apparatus.

When the cover is in overlying or closed position over the mouth of the container 11, the attraction of the striker plates 56 to the magnets 57 hold the cover 12 in that position. When the solenoid 60 is energized and the pusher bracket 61 thrusts forward against the striker angle plate 55, the force of the impact breaks the striker plates 56 away from the magnets 57 and permits the tension spring 40 to propel the cover 12 toward the position indicated by the broken lines 14. An air cylinder or dash pot 62 mounted on the frame of the housing at one end for pivotal movement by means of an anchor 63 is formed with a piston 64 movable in and out of the cylinder 62. At its outer end the piston 64 is pivotally connected to an angle bar 65 which is rigidly fixed to the torsion bar 37. Since movement of the cover 12 from closed toward open position causes clockwise pivotal motion in the angle bar 65 and forces the piston 64 within the cylinder 62, controlled leakage of air from the cylinder 62 regulates the speed with which the cover 12 is brought to open position by the force of the tension spring 40.

The means by which the container 11 is latched in retaining position is similar to the latch means effecting retention of the cover 12 in closed position. Fixed to magnet mounting bracket 68 are magnets 69 shown in FIG. 2 in contact with striker plates 70 mounted on striker angle bracket 71, which is rigidly secured to the torsion bar 30. A solenoid, blocked from view in FIG. 2, is mounted on the frame of the housing, as is magnet mounting bracket 68. Attraction of the striker plates 70 to the magnets 69 holds the container 11 in retaining position until the pusher bracket of the solenoid forces the striker plates away from the magnets and permits the weight of the container 11 to lower the container to discharge position indicated by broken lines 13. A dash pot or air cylinder 73 pivotally mounted by the anchor 74 on the base plate 25 is entered by a piston 75 pivotally mounted on a front frame part 19 of the housing 10 by means of the anchor 76. The air cylinder 73 regulates the rate of descent of the container 11 in the same manner as the air cylinder 62 regulates the rate of ascent of the cover 12.

Figure 5:
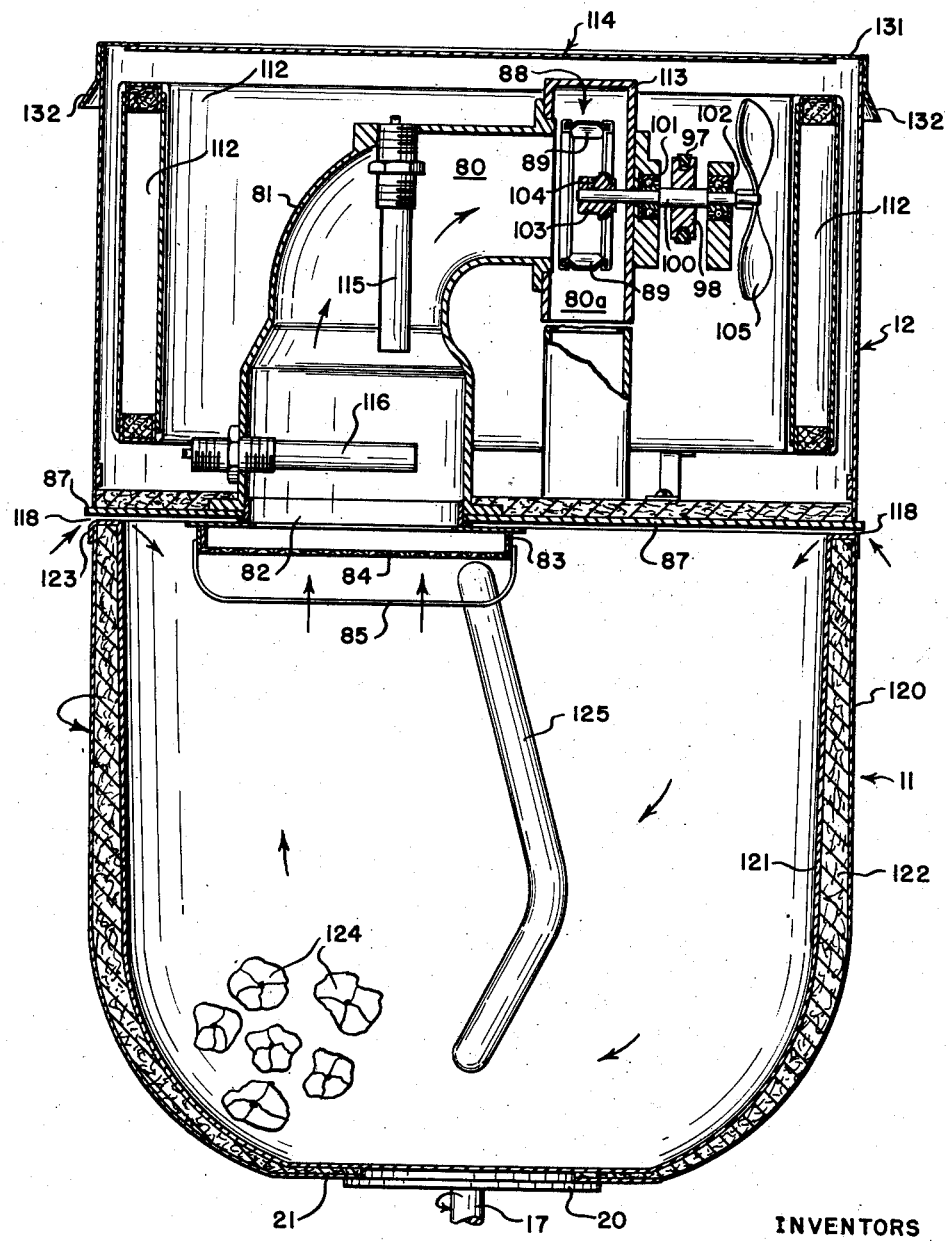
FIG. 5 is a vertical sectional view along the line 5—5 of FIG. 3.

Referring now to FIGS. 3, 4 and 5, the means for impelling air through a passageway 80 in the cover 12 is best seen therein. The relative positions of the container 11 and the cover 12 are shown in FIG. 5. The passageway 80 is formed in the cover by means of an elongated conduit 81 which terminates at one end in an intake duct 82. Extending vertically downward from and around the intake duct 82 is an annular flange 83 which acts as a support for a section of filter cloth 84, which is retained in position by a filter clamping ring 85 across the mouth formed by the intake duct. Intake duct 82 is fixed to the bottom flange 87 and also to one end of the conduit 81.

Drawing air in the direction of the arrows from the container 11 through the filter cloth 84 and the intake duct 82 and into the passageway 80 is an impeller, indicated generally at 88, having impeller blades 89. As also seen in FIGS. 3 and 4, a motor 90 mounted on a support 91 connected to internal support post 92 by a hinge 93 rotates the impeller 88 by means of a motor drive shaft 95 and motor pulley 96. Motor pulley 96 drives V-belt 97, which turns driven pulley 98 fixed to a section of impeller shaft 100. Impeller shaft 110 is journaled in ball bearings 101 and 102 and fixed against axial movement by the enlarged diameter of that portion of the impeller which lies between those bearings. At one end impeller shaft 100 terminates in a collar 103 in which it is secured by set screw 104. The motor 90 thus drives the belt 97 and the impeller 88 through impeller shaft 100, and in addition rotates a propeller 105 fixed to the end of drive shaft 100 away from the impeller 88. The propeller 105 causes convention currents within the cover 12 and aids in maintaining a uniform temperature throughout the interior of the cover.

As seen in FIGS. 4 and 5 the impeller blades 89 impel air from the passageway 80 and an extension 80a thereof into a portion of said extension which terminates in an outlet duct 107 (FIG. 4). A heating element 108 is located in the passageway extension 80a between the impeller 88 and the outlet duct 107. Air passing through the extension 80a contacts heating coils 109 of the element 108 and then passes through the outlet duct 107.

As best seen in FIGS. 3 and 4 the passageway extension 80a and outlet duct 107 are not the only means whereby air drawn from the space within the container 11 is discharged. An exhaust conduit 110 connected by means of a flexible coupling 111 to passageway extension 80b also provides an outlet for the air impelled by the blades 89. Exhaust conduit 110 leads into an annular smoke filter 112 which surrounds the impeller housing 113, the passageway 80, and passageway extensions 80a and 80b. Air from which smoke has been removed by the smoke filter 112 passes through the filter and is discharged through a porous portion of the lid 131 of the cover 12.

As best seen in FIG. 5, there are two temperature responsive members fixed to the wall of the conduit 81 and extending into the passageway 80 formed by that conduit. Temperature responsive member 115 responds to changes in the temperature of the air passing thereby to start a timed cycle which regulates the functions of various elements of the invention. Temperature responsive member 115 may be a thermostat, thermistor probe or other type of device which will meet the needs of the present invention. In particular, a thermistor probe Model #53550-4, manufactured by Fenwal, Inc., of Ashland, Mass., has been found highly satisfactory. The function of temperature responsive member 115 will be described in greater detail hereinafter.

The further temperature responsive member 116 attached to the wall of conduit 81 nearer the intake duct 82 is utilized as an overheat safety device, which interrupts the circuit operating the apparatus in the case of some malfunction which permits the heater coils 109 to remain operative for a longer period than desired.

The arrangement of the container 11 and cover 12 when the container is in retaining position and the cover in overlying or closed position is illustrated in FIG. 5. While portions of the cover, namely filter flange 83, filter cloth 84, and filter clamping ring 85 protrude within the space bounded by the walls of the container 11 in this position, cover 12 does not contact the body of the container but is spaced therefrom by a narrow aperture referred to by numeral 118. As indicated by arrows, air passes from the ambient atmosphere through the aperture 118 and into the space within the container 11. This air replaces the air which is discharged from the cover into the lid 131 after passing through passageway extension 80b, exhaust conduit 110, and smoke filter 112. In actual practice it has been found advantageous to so arrange the impeller 88 so that approximately 25 percent of the air entering the intake duct 82 is discharged from the cover 12 without reentering the container 11. In such an embodiment it will, therefore, be necessary for a substantially equal amount of air to enter the container 11 through the aperture 118 to replace the air discharged into the ambient atmosphere.

The structure of the container 11 is illustrated in detail in FIG. 5. The container includes an outer shell 120, which may be composed of a metal, such as aluminum, stainless steel or other suitable material, spaced from a lining 121 by insulation 122. The lining 121 covers the entire inner surface of the container 11, and at the mouth of the container, is bent around and fixed to the end of the outer shell 120 to form a lip 123. The material from which the lining 121 is formed is preferably one presenting a smooth surface which discourages the adherence of sticky particles, such as coated, popped corn 124, thereto. A silicone resin or a tetrafluoroethylene polymer has been found to possess the desired release properties. Rib 125 is formed in the side wall of the lining 121 and aids in securing a tumbling action of the contents of the container 11 during the rotation thereof. Rib 125 is composed of the same material as the lining, and a multiplicity of such ribs are advantageously utilized.

Another part of the structure of the cover 12 is the hollow, elongated tube 127 which is disposed parallel to the side wall of the cover and normal to the cover lid. The tube 127, which is used to form a passageway through which butter or other lubricating material is added to the container at the proper time during the operation of the apparatus of this invention, is mounted on the cover 12 and supported against movement in the direction of the container 11 by a collar 128. A hinged top 129, carrying a handle 130, permits the tube 127 to be sealed against the entrance of foreign matter at times other than during the addition of the butter to the container 11.

The view of the invention illustrated in FIG. 3 is one in which the lid 131 of the cover has been broken away to reveal the inner structure of the cover. Also seen in that figure is a terminal block 135 which serves the housing for electrical wiring necessary to permit the cover 12 to perform its functions as part of the apparatus of the invention. In FIG. 4 the lid is shown in position on the cover 12 with a flanged hand-gripping portion 132 extending around the periphery of the cover. The lid 131 includes a central portion 133 which permits the passage of waste air therethrough. Central portion 133 has been illustrated as being porous, but may be perforated or otherwise constructed to permit the passage of air after it emerges from the smoke filter 112.

In another form of the apparatus of the present invention which has not been illustrated, passageway extension 80b (see FIG. 4) is sealed by a plug inserted in its open end surrounded in the illustrated from by the flexible coupling 111. Eliminated in this modification of the invention are exhaust conduit 110, flexible coupling 111, and smoke filter 112, as well as the necessity of providing for the discharge of exhaust air from the cover 12, such as perforations formed in the central portion 133 of lid 131. This modification is particularly suited to an installation in which little smoke is generated during the popping or coating operation, or where the presence of some smoke in the container is not objectionable.

Among other parts of the specific embodiment of the invention illustrated in FIG. 2 which have not been previously described is a lamp shield 137 rotatively mounted on shaft 138 for movement by motor 139. Lamp shield 137 encloses a lamp, which is lighted when the machine is in operation and is useful primarily for display purposes. Rotation of the shield 137 by the motor 139 serves to draw attention to the apparatus.

Also seen in FIG. 2 are heater relay 140, fuse boxes 141, and timer 142, all of which are supported by the shelf 143 mounted on the frame of the housing 10. Shelf 143 also supports motor 139 and its rotating lamp assembly. Illustrated in FIGS. 1 and 2 are On-Off switch 148 and Start-Stop button 149.

Positioned below shelf 143 on an angle bracket 144, which extends inwardly from the rear frame of the housing, is a tilt switch 145 which is abutted by contact 146 formed by the end of rotary shaft 17 away from the container 11. Contact 146 engages tilt switch 145 when the rotary container 11 is moved toward discharge position.

*Wiring Diagram*

A typical wiring diagram of an electrical circuit which can be utilized to carry into effect automatically the operations of the apparatus described hereinbefore is shown in FIG. 6. When On-Off switch 148 is moved to "On" position, it closes an outer circuit, indicated generally by reference numeral 150. In this circuit and energized by the closing of the circuit are lamp 136 within shield 137 and lamp motor 139, arranged in parallel with lamp 136. No other device of the apparatus is actuated, but power is supplied to thermistor 115. When Start-Stop button 149 is pressed, an inner circuit 152 is closed, and hold-in relay $R_A$ is energized to keep the circuit closed after Start-Stop button 149 is released. Relay $R_A$ closes thermoswitch contacts $C_A$ to close a subcircuit which includes normally closed microswitch $MS_6$ and normally closed switch 151, the latter being part of the structure of further temperature responsive member 116, which is normally in closed position. Overheating of the air withdrawn from container 11 will open switch 151 of further temperature responsive member 116, throwing out hold-in relay $R_A$ and opening inner circuit 152.

With relay $R_A$ holding in the inner circuit 152, drive motor 26 and impeller motor 90 are actuated. In addition, common terminal 154 of a temperature responsive member in the form of a thermistor 115 receives power, and power is supplied therefrom to normally open switch 155 and normally closed switch 156 of the thermistor circuit. While the wiring diagram is shown with a thermistor probe utilized as the temperature sensing means, it will, of course, be apparent that other temperature sensing means, such as the bimetallic element of a thermostat, may be employed in place thereof.

The positions of switches 155 and 156 are governed by the thermistor probe 157. When the thermistor probe is cold, normally open switch 155 closes and normally closed switch 156 opens. In this position heater relay $R_C$ closes switch 153 and power is supplied to the heater 108 through microswitch $MS_1$, which normally is in closed position. This condition persists until the thermistor probe 157 senses a predetermined temperature of the air in the passageway 80, whereupon switch 155 opens deenergizing switch 153 and the heater 108. At the same time normally closed switch 156 closes. Closing of switch 156 energizes timer latching relay $R_B$, which closes cam-operated microswitch $MS_5$. This closes a subcircuit including timer motor 158 and starts that motor and the rotation of the cams of microswitches $MS_1$ to $MS_5$.

After a predetermined time interval depending upon the nature of the coating composition, the morsels to be coated, or generally, the treatment to be effected, e.g., popping corn, microswitch $MS_2$ is closed by its cam and buzzer 159 sounds to inform the attendant to add butter. After another predetermined time interval, also controlled by the machine function desired, microswitch $MS_3$ is closed by its cam and upper solenoid 60 is actuated to release cover 12. Shortly before microswitch $MS_3$ is closed, the cam associated with microswitch $MS_1$ opens that microswitch and, consequently, the subcircuit including heater 108, thereby ensuring that the heater subcircuit is open. This safety feature operates so that impeller motor 90 does not blow heated air from the cover 12 while the cover is in open position after a heating cycle. If desired, the timer can be set so that microswitch $MS_1$ is opened well before microswitch $MS_3$ is closed. Since impeller motor 90 is still actuated, a blast of unheated air is thereby directed into the container 11 to cool the contents thereof and assure solidification of the coating composition on the particles being coated as tumbling proceeds. This solidification will generally occur when a crackling noise is detected within the tub 11.

After a further predetermined time interval, microswitch $MS_4$ is closed by its cam to energize lower solenoid 160 to permit container 11 to fall toward discharge position. When contact 146 engages tilt switch 145, which is diagrammatically shown in FIG. 6 as microswitch $MS_6$, that microswitch is opened, opening the overheat circuit. This throws out hold-in relay $R_A$ which, since Start-Stop button 149 is not depressed, throws out the entire inner circuit 152. Timer motor 158 continues to operate, however, and microswitch $MS_5$ is held in closed position by its associated cam until it opens at the end of one completed cycle and shuts off timer motor 158. At the end of the cycle microswitches $MS_1$ to $MS_5$ have been reset in their initial positions ready to begin another cycle of operation. Microswitch $MS_6$ is reset in its normally closed position when the container 11 is manually raised to retaining position at the start of the next cycle.

*Operation*

One mode of operation of the present invention by an attendant is as follows.

On-Off switch 149 is first moved to "On" position. This closes outer circuit 150 which supplies power to lamp motor 139 and the lamp mounted within the shield 137, so that the shield 137 rotates and is lighted. No other function of the apparatus is performed at this time. When ready to be charged, the apparatus, which initially is in the position illustrated in FIG. 1 of the drawings, is arranged so that the container 11 is moved to retaining position where a charge, e.g., raw popcorn and sugar composition, is added.

The container is moved to retaining position by the handle 33 and is maintained in this position by the attraction of the striker plates 70 to magnets 69. The cover 12 is then moved from its open, upward position to closed position overlying the container 11, in which position it is maintained by the attraction of the striker plates 56 to the magnets 57.

Start-Stop button 149 is now pressed and released. This closes the inner circuit 152 and commences the rotation of the container 11 and the impeller 88 in the cover 12, in addition to supplying power to the heater 108.

After the air in the container 11 has reached the desired temperature as measured by temperature responsive element 115, motor 158 of timer 142 begins to operate. The contents of the rotating container are now subjected to heating within predetermined temperature range for a fixed time period, after which a buzzer 159 sounds to inform the attendant that butter or suitable oleaginous material should be added through elongated tube 127. After another predetermined period of heating, the heater 108 is shut off while the impeller 88 continues to blow air into the container. The length of time this condition continues is determined by the amount of cooling of the container contents desired. Then the upper solenoid 60 is energized so that pusher bracket 61 strikes angle bracket 55 to disengage striker plates 56 and magnets 57, whereby tension spring 40 raises the cover 12 to its upward, open position against the cushion of air in cylinder 62. After another short interval, the solenoid mounted on bracket 25 energizes its pusher bracket to force striker plates 70 and magnets 69 apart, permitting the weight of the tub or drum 11 to lower same into discharge position, movement being restricted by spring 48 and air cylinder 73.

As the container 11 moves toward discharge position, contact 146 engages tilt switch 145, which opens the inner circuit 152 closed when Start-Stop button 149 was pushed. This ceases rotation of container 11 and stops the impeller 88. The coated popcorn 124 discharged by gravity into receiving pan 15 is further agitated, if necessary, and packaged.

In accordance with a preferred method of operation of the invention, the thermistor 115 is adjusted so that the heater 108 will be deenergized at an air temperature above 325° F. and will be energized at a temperature below about 320° F. Such a setting has been found to result in intervals of about 10 seconds during which the heater is deenergized, spaced between intervals of about 25 to 45 seconds during which the heater is energized. The thermistor 115 operates to energize and deenergize the heater 108 regardless of the operation of the timer 142. Energization of the heater is further dependent on the position of microswitch $MS_1$, as pointed out hereinbefore in the description of the wiring diagram.

A setting of the timer 142 which has been found to yield good results is one in which the buzzer 159 is actuated some 4 minutes 30 seconds after the timer motor 158 starts. Microswitch $MS_1$ opens about 5 minutes 30 seconds after the start of the cycle, and upper and lower solenoids 60 and 160, respectively, are energized approximately 5 minutes 45 seconds, and 6 minutes after the start of the timer motor. After a total of some 6 minutes 30 seconds, microswitch $MS_1$ is returned to normally closed position by its cam and microswitch $MS_5$ moved to open position by its cam, stopping the timer motor 158.

The operation of the apparatus, a specific embodiment of which has been described hereinbefore and illustrated in the drawings, has been found particularly effective in sugar-coating popped corn. In the operation of other apparatus for a similar purpose there was found to be considerable balling or sticking together of the product and an uneven distribution of the coating with respect to the surface of the product to be coated. Such uneven distribution resulted in popcorn which in some cases was dark in some regions and lighter in others, and in other cases only partially coated.

Operation of the present apparatus results in the fusion of discrete particles of molten candy or sugar composition to popcorn as the popcorn and composition are subjected to the heated air recirculated within container 11 and cover 12 and are tumbled or agitated in the container. Preferably, the heated air impelled into the container is "focused" on the charge at a point just before the particles of the charge reach the peak of their trajectory and are on the verge of tumbling or falling downwardly. The focused heat serves to fix or station the coating composition on the popcorn instead of the lining of the container, so that even distribution on the particles is achieved. Continued tumbling causes continued pickup of composition by the coated popcorn until an even coating is effected.

The operation of the apparatus just described is admirably suited to the caramel coating of popcorn, although other coating operations may also be effected. In such caramel coating, the powderous coating composition utilized is saccharine in nature, and a caramel flavor is developed only after a sufficiently elevated temperature is achieved, whereupon an exothermic condition prevails requiring critical reaction control from the standpoint of terminal temperature and duration of the heating period. The heating conditions required for achieving and maintaining an exothermic reaction varies in accordance with the size and composition of the charge in the container 11.

The amount of sensible heat present in parts of the machine vary from time to time throughout the period of use of the machine. Consequent variations in heating requirements are automatically compensated by operation of the thermistor 115 and the probe 157, which serve to sense and signal the point of time whereat thermistor switch 156 is closed to commence the functions of the machine operating under control of timer motor 158, viz., the energizing of buzzer 159 for insertion of butter during the coating operation, upper solenoid 60 to release cover 12, and lower solenoid 160 to discharge coated material from container 11. Further, through the operation of thermistor switch 155 the heater relay circuit is periodically interrupted to permit controlled heating of the coating composition during tumbling within critical temperature ranges without interruption of the delivery of heated air under control of impeller motor 90.

Although the apparatus has been described by a preferred operative embodiment, alternative structures will occur to those skilled in the art. Thus, thermistor probe 157, though advantageously located in passageway 80, may be located elsewhere, such as within the confines of container 11. Although the operation has been described in terms of a caramel candy coating of popped corn, other similar enrobing operations may be carried out using the apparatus described. Thus, powderous candies or sugars may be employed to coat nuts and other comestibles, and fatty powderous materials may also be employed to enrobe such comestibles. In this latter connection powdered fats suitably flavored with chocolate and the like may be melted and caused to adhere to the surface of nuts or other food materials to provide a fatty enrobement.

In addition, the operation has been described primarily as a candy coating apparatus but will also be found useful, as stated hereinbefore, in the popping of corn and other starchy seeds, as well as the seasoning thereof, seasoning and butter being introduced through tube 127. Thus the machine is suitable for a number of in-store uses calling for little mechanical skill and investment.

The automatic positioning of cover 12 over container 11 assures effective recirculation of heated air within the container and maximal heating efficiency and control as the air is drawn from the atmosphere through aperture 118. Hence, a substantially closed treatment vessel is provided, one element of which may be rotated with respect to the other while permitting the ingress of a supply of air for recirculation and in some embodiments an egress of smoke-laden air through cover 12 when passageway extension 80b is not sealed. The apparatus operates automatically to relieve an operator for other tasks, the only manual operation called for being the addition of quantities of comestibles with or without a coating composition to the container, and the signaled insertion of butter once container 11 and cover 12 have been disposed adjacent to one another by manipulation of handle 33 and yoke 36, respectively.

Thus, while the present invention has been described with particular reference to a specific embodiment thereof, it will be understood that the invention is not to be limited by that embodiment, but its scope is to be defined only by reference to the following appended claims.

What is claimed is:

1. An apparatus for applying a coating composition to discrete particles, comprising a container open at one end and disposed in one position to retain a quantity of said particles and said composition and in another position to discharge by gravity the contents thereof, means for moving said container in said retaining position to tumble said contents, a cover overlying the open end of said container when said container is in said retaining position, means mounted on said cover for heating said particles and said composition during the movement of said container to fuse said composition to said particles individually as said particles are tumbled in said container, and means for moving said container from said retaining position to said discharge position.

2. An apparatus for applying a coating composition to discrete particles, comprising a container open at one end and disposed in one position to retain a quantity of said particles and said composition and in another position to discharge by gravity the contents thereof, means for moving said container in said retaining position to tumble said contents, a cover disposed in closed position to overlie the open end of said container when said container is in said retaining position and in open position at a location away from said container, means for moving said cover between said open position and said closed position, means mounted on said cover for heating said particles and said composition as said particles are tumbled in said container to fuse said composition to said particles individually, and means for moving said container from said retaining position to said discharge position.

3. An apparatus for applying a coating composition to discrete particles, comprising a supporting frame, a container open at one end pivotally mounted on said frame in one position to retain a quantity of said particles and said composition and in another position to discharge by gravity the contents thereof, means for moving said container in said retaining position to tumble said contents, a cover pivotally mounted on said frame at a location remote from said container and overlying the open end of said container when said container is in said retaining position, means mounted on said cover for heating said particles and said composition as said particles are tumbled in said container to fuse said composition to said particles individually, means for moving said container between said retaining position and said discharge position, means urging said container toward said discharge position, and latch means for holding said container in said retaining position.

4. An apparatus for applying a coating composition to discrete particles, comprising a supporting frame, a container open at one end pivotally mounted on said frame in one position to retain a quantity of said particles and said composition and in another position to discharge by gravity the contents thereof, means for moving said container in said retaining position to tumble said contents, a cover pivotally mounted on said frame at a location remote from said container, said cover being disposed in closed position to overlie the open end of said container when said container is in said retaining position and in open position at a location away from said container, means for moving said cover between said open position and said closed position, means mounted on said cover for heating said particles and said composition as said particles are tumbled in said container to fuse said composition to said particles individually, means urging said cover toward said open position, latch means for holding said cover in said closed position, and means for moving said container from said retaining position to said discharge position.

5. An apparatus for applying a coating composition to discrete particles, comprising a container open at one end and disposed in one position to retain a quantity of said particles and said composition and in another position to discharge by gravity the contents thereof, means for moving said container between said retaining position and said discharge position, means for moving said container in said retaining position to tumble said contents, a cover overlying the open end of said container when said container is in said retaining position, and means mounted on said cover for continually withdrawing air from said container, heating said air and cycling it back into said container, said last-named means including an intake duct located adjacent to said open end of said container, an outlet duct located adjacent to said open end and spaced laterally from said intake duct, means forming a passageway connecting said intake duct and said outlet duct, means in said passageway for heating air, and means for impelling air from said container into said intake duct, through said passageway, into contact with said heating means and out said outlet duct.

6. An apparatus for applying a coating composition to discrete particles, comprising a container open at one end and disposed in one position to retain a quantity of said particles and said composition and in another position to discharge by gravity the contents thereof, means for moving said container between said retaining position and said discharge position, means for moving said container in said retaining position to tumble said contents, a cover overlying the open end of said container when said container is in said retaining position, and means mounted on said cover for continually withdrawing air from said container, heating said air and cycling a portion thereof back into said container, said last-named means including an intake duct located adjacent to said open end of said container, an outlet duct located adjacent to said open end and spaced laterally from said intake duct, means forming a passageway connecting said intake duct and said outlet duct, means in said passageway for heating air, means for impelling air from said container into said intake duct, through said passageway, into contact with said heating means and out said outlet duct, and an exhaust conduit joining said passageway at a location in advance of said heating means in the direction of flow of air and connecting said passageway with the ambient atmosphere, said impelling means forcing a portion of the air entering said intake duct through said exhaust conduit to the ambient atmosphere.

7. An apparatus for applying a coating composition to discrete particles, comprising a container open at one end and disposed in one position to retain a quantity of said particles and said composition and in another position to discharge by gravity the contents thereof, means for moving said container between said retaining position and said discharge position, means for moving said container in said retaining position to tumble said contents, a cover overlying the open end of said container when said container is in said retaining position, and means mounted on said cover for continually withdrawing air from said container, heating the air and cycling a major portion thereof back into said container, said last-named means including an intake duct located adjacent to the open end of said container, an outlet duct located adjacent to said open end and spaced from said intake duct, means forming a passageway connecting said intake duct and said outlet duct, means in said passageway for heating air, means for impelling air from said container into said intake duct, through said passageway, into contact with said heating means and out said outlet duct, air filter means at said outlet duct and extending through said open end into the space bounded by said container, an exhaust conduit joining said passageway at a location in advance of said heating means in the direction of flow of air and connecting said passageway with the ambient atmosphere, said impelling means forcing a minor portion of the air entering said intake duct through said exhaust conduit to the ambient atmosphere, and filter means interposed between said exhaust conduit and the ambient atmosphere.

8. An apparatus for applying a coating composition to discrete particles, comprising a frame adapted to support parts of said apparatus, a pivot member mounted between side members of said frame for pivotal motion with respect thereto, a container open at one end and fixed to said pivot member for movement therewith, means for moving said pivot member between one position in which said open end of said container is disposed to retain a quantity of said particles and said composition and another position in which said open end is disposed to discharge by gravity the contents thereof, a further pivot member mounted between side members of said frame for pivotal movement with respect thereto, a cover fixed to said further pivot member for movement therewith, means moving said further pivot member between one position in which said cover is disposed away from said container and another position in which it is disposed to overlie said open end of said container when the latter is in said retaining position, means for moving said container in said retaining position to tumble said contents, and means mounted on said cover for heating said particles and said composition as said particles are tumbled in said container to fuse said composition to said particles individually.

9. An apparatus for applying a coating composition to discrete particles, comprising a frame adapted to support parts of said apparatus, a pivot member mounted between side members of said frame for pivotal motion with respect thereto, a container open at one end and fixed to said pivot member for movement therewith, means for moving said pivot member between one position in which said open end of said container is disposed to retain a quantity of said particles and said composition and another position in which said open end is disposed to discharge the contents thereof, latch means for maintaining said pivot member and said container in one of said positions, said latch means including a magnetically attractive part and a magnetically attracted part, one of said parts being fixed to said frame and the other of said parts being fixed to said pivot member, a further pivot member mounted between side members of said frame for pivotal movement with respect thereto, a cover fixed to said further pivot member for movement therewith, means moving said further pivot member between one position in which said cover is disposed away from said container and another position in which it is disposed to overlie said open end of said container when the latter is in said retaining position, and means mounted on said cover for heating said particles and said composition to fuse said composition to said particles individually.

10. An apparatus for applying a coating composition to discrete particles, comprising a frame adapted to support parts of said apparatus, a pivot member mounted between side members of said frame for pivotal motion with respect thereto, a container open at one end and fixed to said pivot member for movement therewith, means for moving said pivot member between one position in which said open end of said container is disposed to retain a quantity of said particles and said composition and another position in which said open end is disposed to discharge the contents thereof, latch means for maintaining said pivot member and said container in one of said positions, said latch means including a magnetically attractive part and a magnetically attracted part, one of said parts being fixed to said frame and the other of said parts being fixed to said pivot member, and electrically energized means for separating said magnetically attractive part and said magnetically attracted part; a further pivot member mounted between side members of said frame for pivotal movement with respect thereto, a cover fixed to said further pivot member for movement therewith, means moving said further pivot member between one position in which said cover is disposed away from said container and another position in which it is disposed to overlie said open end of said container when the latter is in said retaining position, means for moving said container in said retaining position to tumble said contents, and means mounted on said cover for heating said particles and said composition as said particles are tumbled in said container to fuse said composition to said particles individually.

11. An apparatus for applying a coating composition to discrete particles, comprising a container open at one end and disposed in one position to retain a quantity of said particles and said composition and in another position to discharge by gravity the contents thereof, means for moving said container toward said discharge position, a cover disposed in closed position to overlie the open end of said container when said container is in said retaining position and in open position at a location away from said container, means for moving said cover toward said open position, means for rotating said container in said retaining position to tumble said contents, means for heating said particles and said composition as said cover overlies said container and the latter is rotated to tumble its contents to fuse said composition to said particles individually and means for sequentially energizing said cover moving means and said container moving means to discharge coated particles after a cycle of operation.

12. An apparatus for applying a coating composition to discrete particles, comprising a container open at one end and disposed in one position to retain a quantity of said particles and said composition and in another position to discharge by gravity the contents thereof, means for moving said container toward said discharge position, a cover disposed in closed position to overlie the open end of said container when said container is in said retaining position and in open position at a location away from said container, means for moving cover toward said open position, means for rotating said container in said retaining position to tumble said contents, means for heating said particles and said composition as said cover overlies said container and the latter is rotated to tumble its contents to fuse said composition to said particles individually, means for cooling said container contents, and means for energizing in sequence (a) said means for rotating said container in said retaining position and said heating means, (b) said cooling means, (c) said cover moving means, and (d) said container moving means.

13. An apparatus for applying a coating composition to discrete particles, comprising a supporting frame, a container open at one end pivotally mounted on said frame in one position to retain a quantity of said particles and said composition and in another position to discharge by gravity the contents thereof, means urging said container toward said discharge position, latch means for holding said container in said retaining position, said latch means being energizable to release said container from said retaining position, a cover pivotally mounted on said frame at a location remote from said container and disposed in closed position to overlie the open end of said container when said container is in said retaining position and in open position at a location away from said container, means for moving said cover between said open position and said closed position, means urging said cover toward said open position, latch means for holding said cover in said closed position, said latch means being energizable to release said cover from said closed position, means for moving said container in said retaining position to tumble said contents, means mounted on said cover for heating said particles and said composition to fuse said composition to said particles individually as said particles are tumbled in said container, means for energizing in sequence (a) said means for moving said container in said retaining position, (b) said cover latch means, and (c) said container latch means, and means actuated as said container moves from said retaining position toward said discharge position to deenergize said energizing means.

14. An apparatus for applying a coating composition to discrete particles, comprising a supporting frame, a container open at one end pivotally mounted on said frame in one position to retain a quantity of said particles and said composition and in another position to discharge the contents thereof, latch means for holding said container in said retaining position, said latch means being energizable to release said container from said retaining position, a cover pivotally mounted on said frame at a location remote from said container and disposed in closed position to overlie the open end of said container when said container is in said retaining position and in open position at a location away from said container, means for moving said cover between said open position and said closed position, latch means for holding said cover in said closed position, said latch means being energizable to release said cover from said closed position, impeller means mounted on said cover for continually withdrawing air from said container, heating said air and cycling it back into said container, means for rotating said container in said retaining position to tumble said contents, and means for energizing in sequence (a) said means for rotating said container and said impeller means, (b) said cover latch means, and (c) said container latch means.

References Cited in the file of this patent

UNITED STATES PATENTS

| | | |
|---|---|---|
| 278,780 | Daniels | June 5, 1883 |
| 1,309,565 | Cretors | July 8, 1919 |
| 1,880,822 | Cook et al. | Oct. 4, 1932 |
| 2,112,358 | Cretors | Mar. 29, 1938 |
| 2,232,954 | Manley | Feb. 25, 1941 |
| 2,370,955 | Guthrie | Mar. 6, 1945 |
| 2,522,806 | Stageberg | Sept. 19, 1950 |
| 2,782,622 | Candor | Feb. 26, 1957 |